June 20, 1950 | E. J. AGNEW | 2,511,832

TELEGRAPH SWITCHING SYSTEM

Filed Jan. 16, 1945 | 5 Sheets-Sheet 1

INVENTOR
E. J. AGNEW
BY
M. R. Marsh
ATTORNEY

June 20, 1950 E. J. AGNEW 2,511,832

TELEGRAPH SWITCHING SYSTEM

Filed Jan. 16, 1945 5 Sheets-Sheet 2

INVENTOR
E. J. AGNEW

BY

M. R. Marsh

ATTORNEY

June 20, 1950 E. J. AGNEW 2,511,832

TELEGRAPH SWITCHING SYSTEM

Filed Jan. 16, 1945 5 Sheets-Sheet 3

INVENTOR
E. J. AGNEW

BY
M. R. Marsh
ATTORNEY

INVENTOR
E. J. AGNEW
BY
M. R. Marsh
ATTORNEY

June 20, 1950 E. J. AGNEW 2,511,832

TELEGRAPH SWITCHING SYSTEM

Filed Jan. 16, 1945 5 Sheets-Sheet 5

INVENTOR
E. J. AGNEW
BY
M. R. Marsh
ATTORNEY

Patented June 20, 1950

2,511,832

UNITED STATES PATENT OFFICE 2,511,832

TELEGRAPH SWITCHING SYSTEM

Edward J. Agnew, Brooklyn, N. Y., assignor to The Western Union Telegraph Company, New York, N. Y., a corporation of New York Application January 16, 1945, Serial No. 573,050

13 Claims. (Cl. 178—4)

This invention relates to telegraph switching or exchange systems and, more particularly, to reperforator types of telegraph switching systems.

In general, telegraph switching systems of this type provide means whereby messages received over incoming lines or circuits may be stored and re-transmitted over selected outgoing lines or circuits. The receiving lines or circuits terminate in and control mechanisms known as printer-perforators which perforate and print on a tape characters representing the received code combinations. Each receiving printer-perforator has associated therewith a so-called intra-office tape transmitter which is controlled in accordance with the signals stored in the tape prepared by the printer-perforator. The intra-office tape transmitter has an associated cord circuit and plug whereby it may be selectively connected through jacks to any one of a plurality of so-called intra-office perforating mechanisms which prepare a second tape to control an associated line or circuit transmitter. Each outgoing circuit has associated therewith a line tape transmitter adapted to transmit to the sending circuit code combinations representative of the perforations in its control tape. In this manner a message received over any incoming line or circuit is stored in a printed and perforated tape, transmitted intra-office to the desired outgoing terminal, again stored in a perforated tape, and then transmitted over the proper outgoing circuit. Such systems are sometimes called double storage reperforator switching systems.

It is one of the features of the present invention to provide means operable in conjunction with a system of the above general type whereby certain messages, hereinafter referred to as "X" messages, may receive special handling and thereby be transmitted to an outgoing line out of turn or ahead of messages which may be waiting for transmission to such a line at the time an "X" message is received.

Another feature of the invention resides in the provision of means for normally transmitting an "X" message to an outgoing circuit only at the end of transmission of a message which may be in progress of transmission at the time the "X" message transmitter is connected to the circuit.

In this connection, another feature of the invention resides in the provision of means whereby on the operation of a control, the "X" message will be transmitted at the time the "X" message transmitter is connected to the outgoing circuit without waiting for the end of a message which may be then in progress of transmission.

In connection with the above, another feature of the invention resides in a character reading device in the "X" cord circuit which reads the signals being transmitted over an outgoing circuit and connects the "X" message tape transmitter thereto to transmit thereover only after the detection of an end-of-message signal following the message which may be in the process of transmission from the regular line transmitter. In other words, the system of the present invention provides a character reading device which is operative only when it is desired to transmit an "X" message over an outgoing circuit. With this arrangement a character reading device for each outgoing circuit is not required, and since the number of "X" message transmitters is greatly less than the number of outgoing circuits, a considerable saving in equipment at an exchange of the above type is possible as compared to earlier systems where each outgoing circuit had an associated character reading device.

A further feature of the present invention resides in the provision of means for the "X" cord circuit to detect and indicate the type of outgoing circuit to which the "X" tape transmitter may be connected whereby among other things the proper polarity is applied to the connected circuit when the "X" transmitter is locked under "tight tape" conditions.

The above mentioned and other features of the invention will be more apparent hereinafter when taken in conjunction with the accompanying drawings, in the latter of which:

Figures 1, 6:
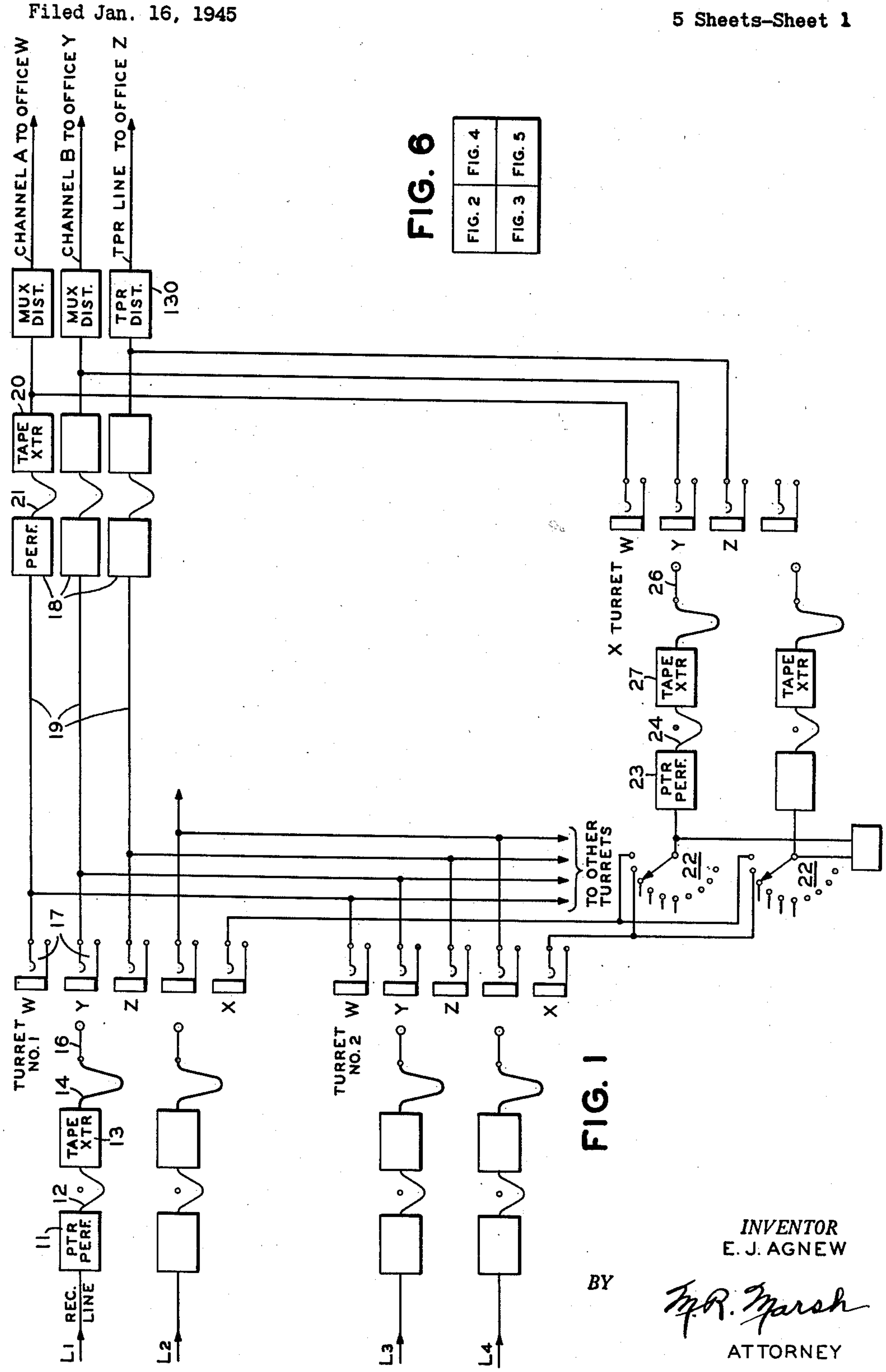
Fig. 1 is a diagrammatic representation of a switching system embodying the features of the present invention.
Fig. 6 shows how Figs. 2 to 5 may be arranged to produce a complete circuit drawing.

Referring first to Fig. 1, which is a diagrammatic representation of a system of the type to which the present invention may be applied, L1 to L4 represent incoming lines or circuits over which code combinations representing messages may be received. Each such circuit terminates in a printer-perforator 11 which prepares a tape 12 in accordance with received signals. The tapes 12 have printed along one edge characters representing the code combinations and are perforated in another section to represent, in accordance with a predetermined arrangement, the received code combinations. Each tape 12 has associated therewith a tape transmitter 13, hereinafter referred to as the intra-office tape transmitter, adapted to be controlled in accordance with the perforations in its tape. Each tape transmitter 13 has a cord 14 and a plug 16 associated therewith whereby the tape transmitter may be connected through jacks 17 to selected perforators 18. The tape transmitters 13 with their associated equipment such as printer perforators 11, cords 14 and plugs 16 are arranged in groups and each such group constitutes a switching position. These switching positions are hereinafter referred to as turrets and the various pieces of equipment thereat are identified and referred to accordingly. The three jacks 17 identified by the letters W, Y, Z in each of the two switching positions or turrets No. 1 and 2 shown are connected in multiple to associated perforators 18 over intra-office circuits 19.

When a message is received over an incoming circuit, it is printed and perforated in the tape 12 and a turret operator noting the destination of the message, places the plug 16 in the appropriate jack at that turret, whereupon the message is transmitted intra-office and reperforated by a perforator 18 in another tape 21. Each of the tapes 21 from the perforators 18 control associated so-called line transmitters 20 which in turn through appropriate distributors affect transmission of the message characters to sending circuits. In Fig. 1 the circuit to remote office W is assumed to be over the A channel of a multiplex, that to remote office Y over the B channel of a multiplex, and that to remote office Z over a teleprinter circuit. Systems of the above general type are well known in the telegraph art and examples thereof may be found in Patent No. 2,279,295, issued April 14, 1942, to W. B. Blanton.

In order to expedite the switching of messages intra-office, the intra-office circuits represented by the reference numeral 19 are arranged to operate at a considerably higher rate than that at which the incoming and outgoing circuits normally operate. Accordingly, it sometimes happens that on a busy outgoing circuit a number of messages may be stored in a tape such as 21 of a line tape transmitter 20 with the messages stored in such a tape in the order in which they are received over the incoming circuits. When an "X" message is received at a switching center, it is highly desirable that such a message be transmitted over an outgoing circuit without waiting for the transmission of messages which may be stored in the tape such as 21.

When these "X" messages are received on a printer-perforator, the turret operator is apprised of such a message and she inserts the associated plug 16 in a so-called "X" jack of which each turret has one or more. The "X" jacks of all the turrets extend to a so-called "X" turret and they may be connected thereto through line finder switches such as 22 which, in a manner well known, operates to connect an "X" turret printer-perforator 23 to the jack in which a plug such as 16 may be inserted. As shown in Fig. 1, there are two "X" turret printer-perforators 23 and the line switches 22 operate in such a manner that each time a plug 16 is inserted in an "X" jack, either one or the other of the printer-perforators 23 will be connected to such a jack to effect recording of the message in its associated printed and perforated tape 24. The "X" turret operator on observing a message in the tape 24 reads the address and inserts the plug 26 connected to the tape transmitter 27 associated with the tape into the proper "X" turret jack such as those indicated W, Y or Z.

Each "X" turret cord circuit associated with a plug 26 and tape transmitter 27 has included therein a reading device. If the "X" turret tape transmitter 27 is connected to a busy outgoing circuit, the reading device reads the characters of the message being transmitted and normally holds up transmission from the "X" turret tape transmitter 27 until an end-of-message signal is read whereupon transmission begins from the "X" turret transmitter regardless of the number of messages that may be stored in the tape 21 of the associated line transmitter 20. If there are no characters being transmitted over the associated sending circuit, the "X" turret tape transmitter is substantially immediately connected thereto to transmit the message stored in its associated tape 24. Although the "X" turret tape transmitter normally waits for the end-of-message signal to be transmitted before beginning transmission of the "X" message, the operation of a so-called "pre-empt" key permits the "X" turret tape transmitter to be connected to a sending circuit at any time, such as in the middle of a message in the progress of being transmitted from the line transmitter 20.

One multiplex channel may mark on negative potential and space on positive potential whereas another channel may mark on positive and space on negative. It is assumed that the channels to offices W and Y space and mark on different polarities and are identified as being channels A and B, respectively, of multiplex circuits. The "X" tape transmitter 27 is adapted to operate into either an A channel or a B channel of a multiplex, or into a teleprinter line, and means are provided to determine which type of line may be connected thereto. This is necessary since spacing battery (positive on an A channel and negative on a B channel) must be applied to the line when and if the "X" turret tape transmitter tape lever is operated during transmission of a message therefrom. If connected to a teleprinter circuit, marking battery must be applied to the line when the tape lever of the "X" turret tape transmitter is opened.

Let it be assumed that the line transmitter 20 associated with the A channel of a multiplex circuit extending to remote office W, is transmitting a message and that a number of other messages are stored in its control tape 21 waiting to be transmitted in turn. Let it be further assumed that an "X" message is received at the "X" turret for transmission to remote office W while the line tape transmitter is transmitting thereto. The "X" turret operator observing the destination of the message in the tape 24 will insert the plug 26 in the "X" turret jack W. Since it is assumed that the sending circuit to remote office W is over an A channel of a multiplex circuit the assumed polarities of potential for such a channel will be marking negative and spacing positive.

Referring now to Figs. 2 to 5, a detailed description of the circuits involved incident to the transmission of the "X" message from the "X" turret tape transmitter 27 under a number of different conditions will now be described.

The insertion of plug 26 in "X" turret jack W completes a circuit from negative potential through the coil of a relay 28, the number 1 contacts of the jack and plug, the right hand coil of another relay 29 and resistance 31 to ground. The flow of current through this circuit is limited by resistance 31 to a value below that necessary to operate relay 28 but is sufficient to operate relay 29.

When the line transmitter 20 is transmitting to the multiplex distributor 32, the tongues of the transmitter apply combinations of positive and negative potential through tongues and back contacts of relay 28 to the segments 1 to 5 of the multiplex transmitting ring. These combinations of potential are in accordance with the character over the pins in the tape transmitter 20 at any particular time. The plugging operation establishes leak circuits from the tongues of the line transmitter 20 through contacts Nos. 4, 5, 6, 7 and 8 of the plug and jack and separate resistances 33 to the control grids of a set of five vacuum tubes 34. The leak circuit from the fourth tongue of the tape transmitter 20 passes through the back contact and right hand tongue of a relay 36 to the seventh conductor of the cable 52 of jack W. Normally, the grids of vacuum tubes 34 have negative potential applied thereto from the right hand tongue and back contact of a relay 37, through the back contact and outer tongue of relay 29 and resistances 38, similar in value to resistance 33.

When relay 29 operates in the manner set forth, the outer tongue thereof removes the normal negative potential from the grid circuits of vacuum tubes 34 and applies a low-value positive potential thereto through the resistance 40 and individual resistances 38. Thus, circuits are established whereby the potentials on the grids of the individual vacuum tubes 34 correspond to the positions of the tongues of the tape transmitter 20. For the assumed conditions, a grid of a vacuum tube 34 will be negative when its respective tongue of transmitter 20 contacts its marking bus bar and positive when its associated tongue contacts the spacing bus bar. When the grid of a vacuum tube 34 is rendered positive, plate current is permitted to flow through the tube and plate current is cut off when the grid is negative. In the individual plate circuits of the vacuum tubes 34 are the coils of five so-called reading relays 39*a* to 39*e*. The other side of the coils of relays 39 are connected to positive potential and, therefore, when a tube is passing plate current the associated relay will be operated and will be unoperated when the tube is not passing current. Thus, the reading relays 39 are operated in various combinations to represent each character as they are transmitted from the line tape transmitter 20.

A code combination wherein the first, second, third and fifth impulses thereof are spacing and the fourth impulse marking represents a period and the stepping of such a character over the pins of the tape transmitter 20 establishes a circuit for the operation of a relay 41. This circuit may be traced from positive potential through the coil of relay 41, the back contact and tongue of a relay 42, the left hand tongue and front contact of relay 37, the fifth tongue and back contact of a relay 43, the back contact and outer tongue of relay 39*d*, the outer tongue and front contact of 39*e*, the back contact and outer tongue of relay 43, the outer tongue and front contact of relay 39*c*, the back contact and fourth tongue of relay 43, the outer tongue and front contact of relay 39*b*, the back contact and third tongue of relay 43, the outer tongue and front contact of relay 39*a*, the back contact and second tongue of relay 43, the outer tongue and back contact of a relay 44, the back contact and outer tongue of a relay 46, the back contact and inner tongue of a relay 47 through the third tongue and back contact of relay 59 to ground. The coil of relay 37 is in shunt relation with that part of the above described circuit extending from the front contact of the said relay and it will, therefore, be energized on completion of that part of the circuit and its energization completes the rest of the said circuit including the coil of relay 41 whereby relay 41 is energized. Thus, when a period is stepped over the pins of the line tape transmitter 20, relay 41 will become energized.

When the first period is stepped out of the line transmitter 20 all the tongues thereof contact the spacing bus bar whereupon positive potential will be applied to all the grids of vacuum tubes 34 so that all the relays 39 become operated. This condition establishes a circuit for the operation of relay 42. This circuit may be traced from positive potential through the coil of relay 41, the front contact and tongue thereof, the coil of relay 42, and through a part of the above-described circuit including the outer tongues and make contacts of relays 39*e*, *c*, *b* and *a*, the second, third, fourth and sixth tongues of relay 43 and contacts of relays 44, 46 and 29 to ground.

If the next character following the first period in the line transmitter 20 is any other except a blank or a period, relays 41 and 42 will be released as the reading relays 39 are operated in accordance with this character. Such a character will effect release of one or more of the reading relays 39 whereupon the circuit through the outer tongues and front contacts of relays 39*a*, *b*, *c* and *e* will be interrupted to open the circuit through relays 41 and 42. Each message transmitted from the line transmitter 20 is terminated by an end-of-message signal and in the system to which the present invention is applicable, the end-of-message signal comprises two periods in consecutive order with no character except possibly a blank between the two periods.

When the end-of-message signal is being transmitted from the line transmitter 20, the first period in being stepped into and out of the transmitter effects operation of relays 41 and 42 in the manner set forth. If such a period is the first of an end-of-message signal and no character, with the exception of a blank, intervenes between this period and a second period, the setting of the tongue of transmitter 20 in accordance with the second period again operates certain of the relays 39 so that the described circuit including the outer tongues of these relays, the second to fifth tongues and back contacts of relay 43, through the coil of relay 37 to positive potential is completed. This circuit again operates relay 37 and the above circuit is extended through the tongue and front contact of relay 42, the outer tongue and back contact of relay 47, and through the coil of relay 48 to positive potential. Relay 48 thereupon operates and applies ground through its left hand tongue and front contact, through the coil of relay 44 to positive potential whereupon relay 44 is energized.

Normally, each time the brushes 49 of the multiplex distributor 32 contact segment 51 of the local ring, a positive step pulse is transmitted over conductor 10 of cable 52, through both coils of a differential relay 54, back contact and left hand tongue of relay 28, both coils of differential relay 36, and the step magnet 56 of the line transmitter 20 to ground. Thus the tape transmitter under normal conditions is stepped for each revolution of the multiplex distributor brushes. When the plug 26 is inserted in a jack such as the W jack of the "X" turret, a parallel circuit for the step pulse after passing through both coils of differentially wound relay 54 is extended through contacts No. 9 of the plug 26 and jack W to the middle tongue of relay 44. Accordingly the operation of relay 44 extends the step pulse circuit from the front contact of the center tongue of relay 44 through the normally closed contacts 57 of relay 46 and the coil of a relay 58 to ground. Relay 44 in operating establishes a locking circuit for itself which includes its front contact and inner tongue, the back contact and left hand tongue of a relay 59 and the third tongue and front contact of relay 29.

With the step pulse circuit completed through the coil of relay 58, the next step pulse which is the one that will step the second period out of the line transmitter 20 also effects energization of relay 58. Operation of relay 58 extends the ground on the outer tongue thereof through the coil of relay 46 to positive potential. Relay 46 thereupon becomes energized and locks up through the front contact of the first tongue thereof. Relay 46 in operating also completes a circuit from positive potential through the coil of a relay 61, front contact and outer tongue of relay 46, back contact and inner tongue of relay 47, and the third tongue and back contact of relay 59 to ground, whereupon relay 61 becomes energized. Operation of relay 61 through its first five right hand tongues and associated front contacts connects the tongues of the "X" tape transmitter 27 through contacts 4 to 8 of the plug and jack to the transmitting segments numbered 1 to 5 of the multiplex distributor 32.

When relay 46 operates, a circuit is also completed from ground through the outer tongue and back contact of relay 59, the third tongue and front contact of relay 46, and the left hand coil of relay 29 to the circuit including the No. 1 contact of the plug and jack and the coil of relay 28 to negative potential. This circuit shunts the resistance 31 whereupon the current through relay 28 is sufficient to cause its operation. When relay 28 operates, the individual circuits normally extending from the tongues of the line tape transmitter 20 to the transmitting segments 1 to 5 of the multiplex distributor 32 are interrupted.

When the "X" turret plug 26 is inserted in an associated jack assigned to an outgoing circuit, the second and third contacts of the plug and jack extend the marking and spacing potentials from the multiplex distributor to the sixth and seventh tongues of relay 61. If the plug is inserted in a jack assigned to an A channel, the marking potential will be negative and the spacing positive, and at the associated jack circuit these potentials are normally connected through the sixth and seventh tongues of a relay 28 and associated back contacts to the spacing and marking bus bars of the associated line transmitter such as 20.

When relay 61 operates in the manner described, the multiplex marking and spacing potentials are applied through front contacts of the sixth and seventh tongues of relay 61 to the marking and spacing bus bars of the "X" turret transmitter 27. The marking potential is applied directly from the sixth tongue of relay 61 to the marking bus bar while the spacing potential from the seventh tongue of relay 61 extends through the inner tongue and back contact of relay 43 and the outer tongue and back contact of a relay 62 to the spacing bus bar of the "X" transmitter 27. Relays 28 and 61 operate substantially together and as relay 28 operates its sixth and seventh tongues removes the marking and spacing potential from the bus bars of the line transmitter 20. Since these two relays operate when the left hand brush 49 of the multiplex distributor 32 is contacting segment 51 or at some time other than when the right hand or sending brush 49 is contacting the transmitting segments 1 to 5 of the transmitting ring, there is no interruption or mutilation of a code group transmitted by the multiplex distributor.

Operation of relay 61 at its left hand tongue interrupts a circuit heretofore extending to a lamp 65. The circuit to the lamp 65 before operation of relay 61 extended through the lamp, back contacts and tongues of relays 59 and 61, to ground at the front contact and inner tongue of relay 29. As set forth, relay 29 was operated at the beginning of the sequence of operation to complete the circuit to the lamp 65. The illumination of lamp 62 indicates to the operator that the associated "X" turret transmitter 27 has been connected to an operative multiplex channel and, should the channel be busy, that the associated reading device will immediately commence reading the characters being transmitted over the multiplex channel and connect the "X" tape transmitter 27 thereto when the end-of message signal of the message, then in progress of transmission, reaches the line transmitter 20. When lamp 65 ceases to be illuminated, which occurs on the operation of relay 61, it indicates to the "X" turret operator that the "X" transmitter 27 is operatively connected to the multiplex distributor for transmission of a message thereto. When relay 28 operates, it opens the step pulse circuit normally extending through the back contact and left hand tongue thereof to the step magnet 56 of the line transmitter 20. Accordingly, the line transmitter 20 does not stay locked down but the pins thereof are permitted to sense the next character in the tape following the second period of the transmitted end-of-message signal of the last message transmitted therefrom.

If the line transmitter 20 should happen to be idle when an "X" transmitter, such as 27, is connected to the associated multiplex channel, means are provided whereby after a predetermined length of time the "X" transmitter will be connected to the multiplex channel. When a line transmitter connected to a multiplex channel is idle, blank code combinations are transmitted over the associated channel and this condition exists whether or not the line transmitter is idle due to having no further messages to transmit or because the tape lever is operated due to taut tape. The tape may be taut to cause the transmission of blanks during the transmission of a message or before a complete message has been transmitted and it is normally undesirable to connect the "X" message transmitter to the multiplex channel at such a time.

Assume that the line transmitter 20 associated with the A channel of a multiplex has completed the transmission of a message in its control tape 21 and for the time being there are no more messages stored therein. As is the usual arrangement, the perforator 18 will perforate sufficient blank tape to advance the last message character or the end-of-message signal of such a message over the pins of the transmitter and shortly thereafter the tape 21 will become taut and cause the tape lever contacts 71 to open. With the contacts 71 open, the next step pulse from the local ring of the multiplex distributor will pass through only the left hand coil of relay 36 and cause the operation thereof. The relay 36 is locked operated by a circuit from positive potential through the left hand coil of a relay 72, the left hand tongue and front contact and coil of relay 36, and the coil of the step magnet 56 of transmitter 20 to ground. With step magnet 56 operated by the above circuit, the tongues thereof are locked against the spacing bus bar and this condition will exist until more tape is perforated by the perforator 18 to permit the tape lever contact 71 to close. With the tongues of tape transmitter 20 locked against the spacing bus bar, a blank code combination is transmitted over the associated multiplex channel for each revolution of the brushes. With the above assumed condition, the intra-office circuit 19 is at this time also idle and during such a condition relay 73 will be unoperated. Relay 73 is operated when the associated intra-office circuit is busy and although the circuits for operating this relay are not shown in the drawings, it may be operated in the manner relay 87, Fig. 3 of Patent No. 2,279,295, is operated. Relay 72 operates in series with relay 36 and if at the time of operation thereof, relay 73 is unoperated, relay 74 will be operated through an obvious circuit. Relay 74 remains locked up as long as relay 73 remains in an unoperated condition.

The seventh conductor of cable 52 at the jack circuit is normally connected through the tongue and back contact of relay 74 to the fourth tongue of the line transmitter 20, and as heretofore described permits an "X" cord circuit when plugged up to the associated jack to determine the character of the fourth pulse of each code combination transmitted from the busy line transmitter. For the above assumed conditions of an idle line transmitter 20 blanks are being transmitted to the outgoing mutliplex channel and with relay 74 operated during the time a connection from the seventh conductor of cable 52 through a tongue and make contact of relays 36, 74 to the marking bus bar M of line transmitter 20 is established.

Figure 2:
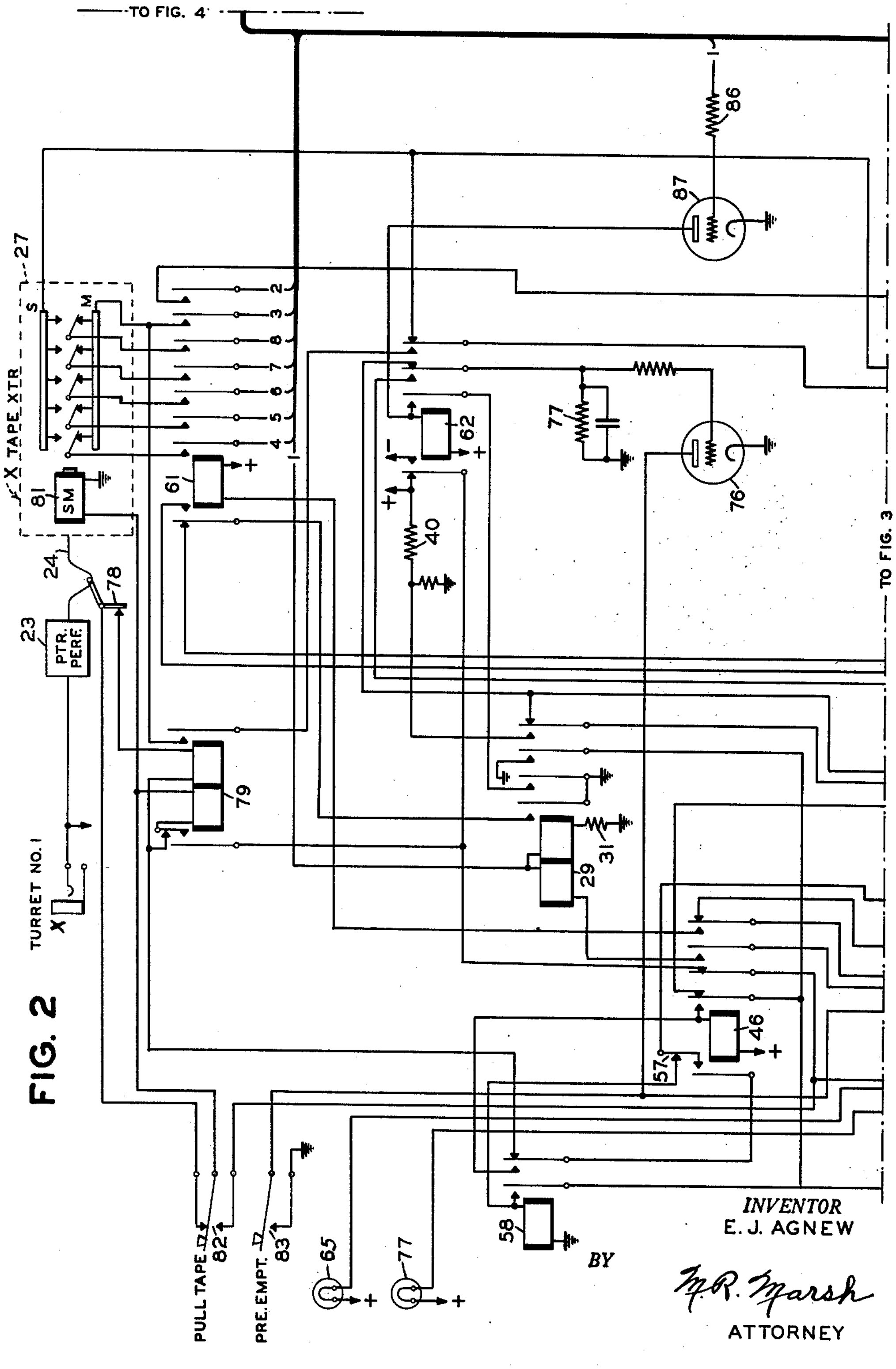
Figs. 2 to 5 are detailed circuit drawings of the part of the system shown in Fig. 1 relating to the present invention.
Figure 3:
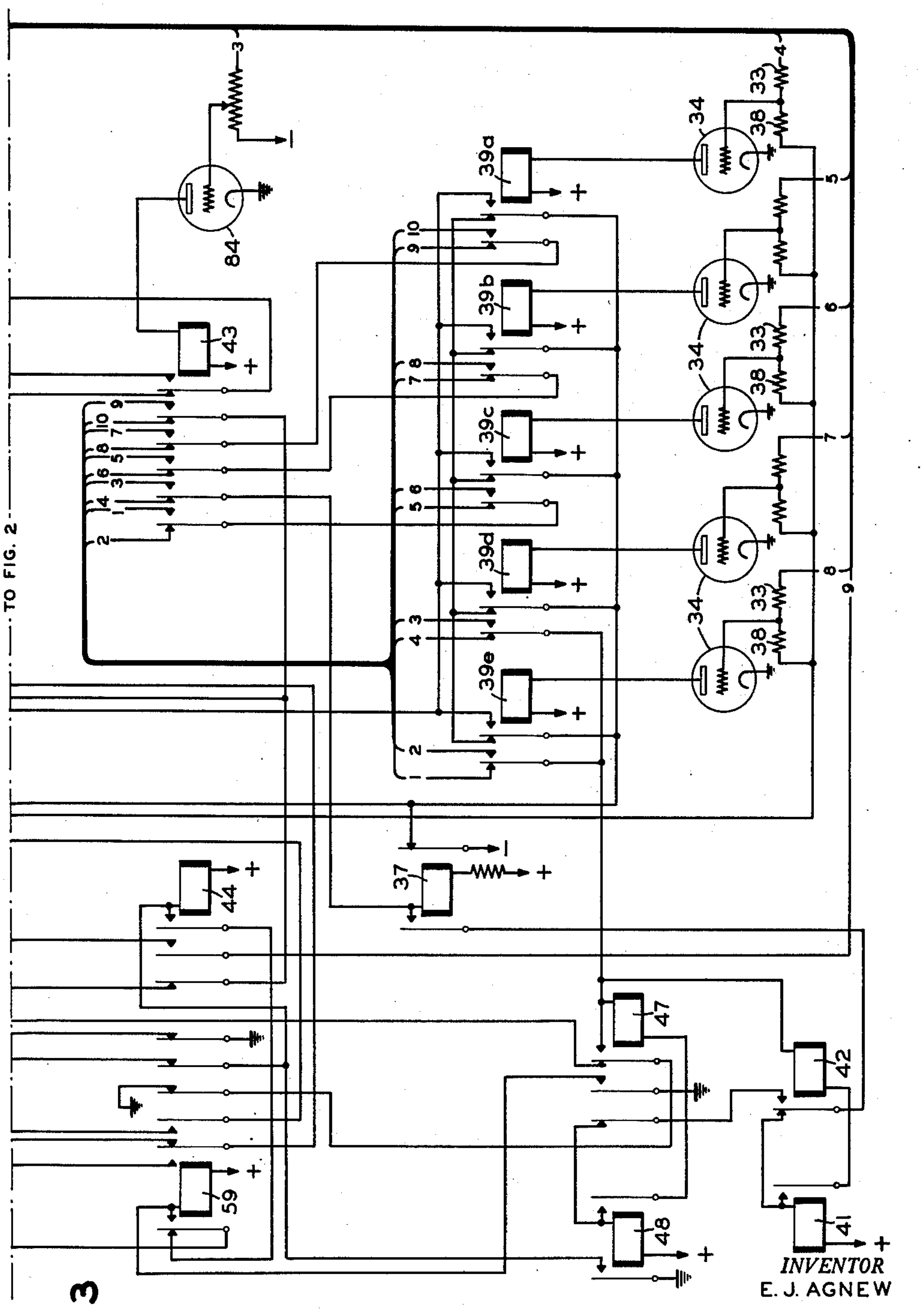
Figure 4:
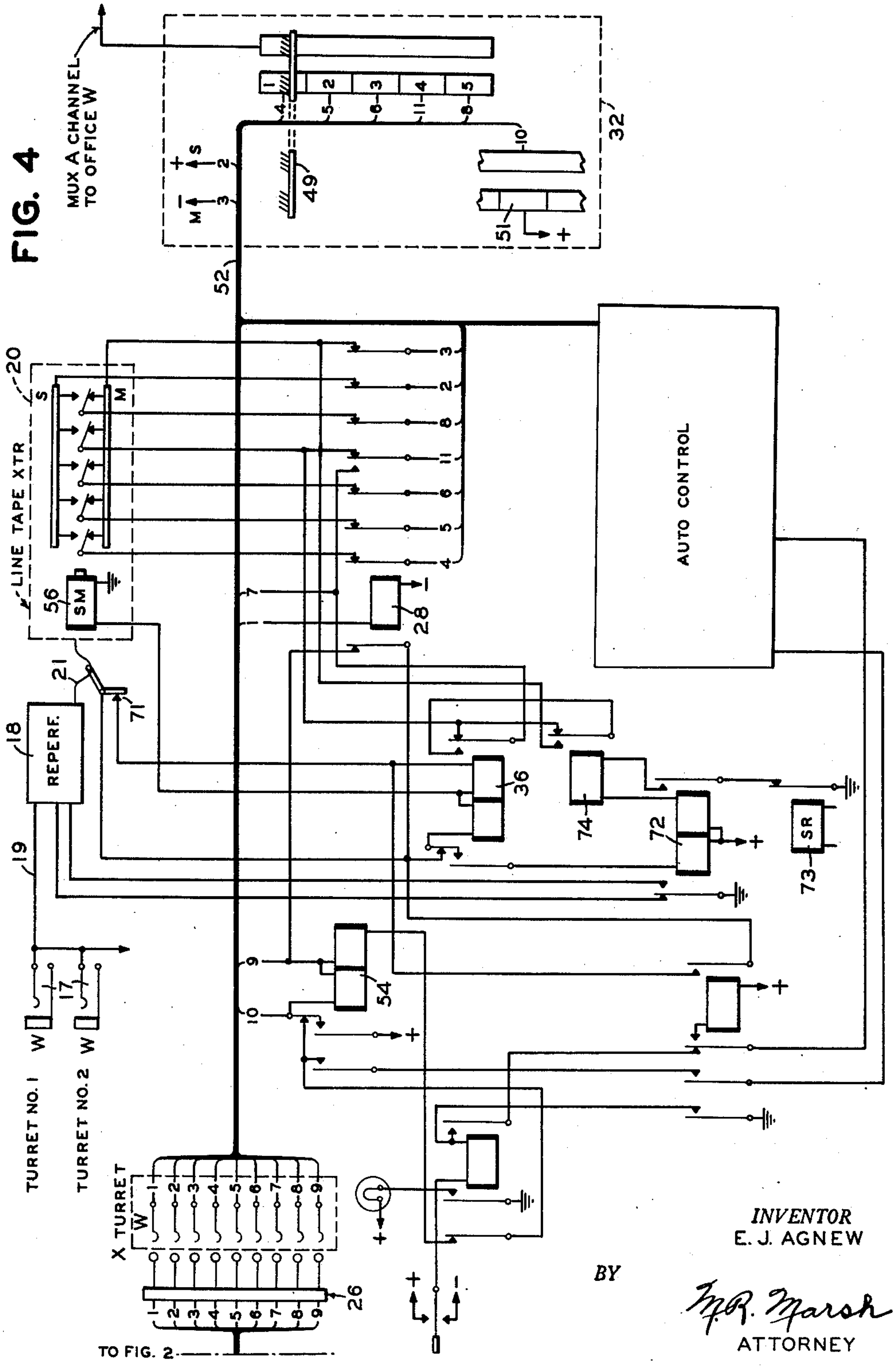

With the jack circuit in this condition, the plugging of an "X" plug 26 into an "X" turret jack such as the one shown in Fig. 2 will permit the reading device of the cord circuit to function as if a period were being transmitted from the associated line transmitter 20 even though the associated multiplex is transmitting blanks. For the above condition relays 39*a*, *b*, *c* and *e* will be operated while relay 39*d* will not be operated. The operation of relays 39 in such a combination as pointed out completes a circuit through the coil of relay 37. Relay 37 thereupon becomes operated and at its right hand tongue removes the negative potential normally applied through the second right hand tongue and back contact of relay 62 to the control grid of a vacuum tube 76. Negative potential on the grid of vacuum tube 76 normally keeps the same from passing current and a predetermined length of time after the removal of the negative potential therefrom it will pass current. A grid leak device 77 consisting of a resistance and condenser determines the time lag between the removal of the negative potential from the grid circuit and the passing of current through vacuum tube 76. When vacuum tube 76 passes current, a circuit is completed from the plate thereof through the fourth right hand tongue of relay 59 and the coil of relay 44 to positive potential. This circuit effects operation of relay 44 which locks up through its first right hand tongue and a back contact of relay 59 and a make contact of relay 29 to ground. The operation of relay 44 in the manner set forth above extends the step pulse circuit to relay 58 to cause operation thereof which in turn effects operation of relay 46. Relay 46 in turn effects operation of relays 28 and 61 to transfer the control of the multiplex distributor from the line transmitter 20 to the "X" transmitter 27. Thus when the line transmitter is idle, a condition is set up whereby a period is read in the connected "X" cord circuit reading device and if this condition prevails for a predetermined length of time, as determined by the grid leak 77, the transfer of the "X" transmitter to the sending circuit is effected.

When an "X" transmitter such as 27 is connected to a sending circuit such as the A channel of a multiplex circuit, the reading device including the vacuum tubes 34 and relays 39 read each character transmitted from the "X" transmitter in the same manner as it reads characters transmitted from a busy line transmitter 20. Each "X" message is terminated by an end-of-message signal consisting of two periods and as the first one of these is stepped over the pins of the "X" transmitter, relay 41 is operated in conjunction with the operation of relay 37. As the first period in the tape is stepped out of the "X" transmitter relay 42 operates. The second period being stepped over the pins of the "X" transmitter effects operation of relay 48 which in turn completes a circuit for the operation of relay 47. Relay 47 in operating by its second tongue and front contact completes a circuit from ground through the coil of relay 59 to positive potential. Relay 59 thereupon operates and locks up through a front contact and its left hand tongue and also opens the operating circuit to relays 28 and 61. Relays 28 and 61 thereupon release and transfer the tongues of the transmitter 20 back to associated sending segments of the multiplex distributor 32 and remove the tongues of the "X" transmitter therefrom.

The operation of relay 59 also completes a circuit through the front contact and first right hand tongue thereof to cause illumination of a lamp 77. The illumination of lamp 77 indicates to the "X" turret operator that the transmission of the "X" message is complete and that the associated plug 26 may be removed from the jack. On the removal of the plug 26 from the jack, the circuit to relay 29 is interrupted which in turn on releasing interrupts the circuits to relays 46 and 59 whereby said relays and the associated cord circuit return to their normal condition.

If while the "X" tape transmitter 27 is transmitting to a sending circuit and its associated tape lever is operated to open its contacts 78, the next step pulse from the distributor will pass only through the left hand coil of the auto-control relay 79 of the "X" cord circuit to cause operation thereof. When the tape 24 is not taut, the step pulses pass through both coils of relay 79 and have no effect thereon, and continue to ground through the step magnet 81 of the "X" transmitter 27. When relay 79 operates, the first left hand tongue thereof establishes a locking circuit therethrough from positive potential at the back contact and left hand tongue of relay 62, the left hand coil of relay 79, through the step magnet 81 to ground. The tongues of the transmitter 27 are held against their spacing bus bar when the step magnet 81 is energized and therefore for this condition all-spacing code combinations are transmitted to the sending circuit. The next step pulse after the closing of the tape lever contacts 18 due to more tape accumulating thereat effects release of relay 79 and step magnet 81 so that the tongues of transmitter 27 may be positioned in accordance with the character over the pins in the "X" tape transmitter and the transmission of message characters resumed. The operation of a pull tape key 82 during the time that the "X" cord circuit is plugged up has the same effect as opening the tape lever contacts 78 and permits adjustment of the tape therein should such be desired. Operation of key 82 when the "X" cord circuit is not plugged up effects energization of the step magnet 81 by a circuit through back contacts of relays 62 and 46.

Under some conditions it may be undesirable to wait for the line transmitter such as 20 to complete the transmission of a message that is being transmitted before connecting the "X" tape transmitter 27 to the sending circuit. If such is the case a so-called pre-empt key 83 in the "X" cord circuit may be operated whereby the "X" tape transmitter is immediately connected to the transmitting line or channel. Operation of key 83 applies ground through the back contact and fourth tongue of relay 59 and the coil of relay 44 to positive potential, thereby effecting operation of relay 44. As set forth, operation of relay 44 conditioned the circuits to connect the "X" transmitter to the sending circuit and disconnect the line transmitter therefrom. The pre-empt key 83 is, of course, operated after the plug 26 is inserted in the jack and when operated the connection of the "X" transmitter to the sending circuit is effected without waiting for an end-of-message signal to be read in the reading device or the delay provided by the vacuum tube 76.

In the above description it was assumed that the "X" cord circuit was plugged up to a jack associated with an A channel of a multiplex circuit wherein marking and spacing conditions were characterized by negative and positive potentials, respectively. On a B channel of a multiplex circuit, as indicated at the distributor 132, Fig. 5, the marking and spacing conditions are positive and negative potentials, respectively, and the operation of the "X" cord circuit in some respects is different when plugged up to a B channel than when plugged up to an A channel. In a jack associated with a B channel, conductors 2 and 3 from the multiplex distributor 132 have positive and negative potentials thereon. The extension of conductor 3 to an "X" cord circuit establishes a leak circuit to the grid of a vacuum tube 84 and when plugged up to an A circuit, negative potential on conductor 3 maintains vacuum tube 84 unconducting whereas the positive potential when plugged up to a B channel renders tube 84 conducting. Relay 43 in the plate circuit of tube 84 therefore is energized when the "X" cord circuit is plugged up to a B channel and deenergized when the "X" cord circuit is plugged up to an A channel.

The operation of relay 43 connects the front contact of the seventh tongue of relay 61 through the first tongue and front contact of relay 43 to the spacing bus bar of the "X" transmitter 27 so that when relay 61 subsequently operates, negative potential will be applied to the spacing bus bar. The positive marking potential from the distributor 132 extends through the No. 3 contacts of the plug and jack 26 to the sixth tongue of relay 61, the front contact of which is connected to the marking bus bar M of the "X" transmitter 27.

The operation of relay 43 also through its second to sixth tongues reverses the circuits associated with the front and back contacts of the outer tongues of relays 39 in such a manner that when these relays are operated in accordance with a period code combination being transmitted over the B channel, a circuit will be completed to effect operation of relay 37. For this condition, only relay 39*d* will be operated while the other relays 39*a*, *b*, *c* and *e* will be unoperated. If a second period follows the first, the "X" transmitter is switched to the sending circuit and the previously connected line transmitter disconnected therefrom in the manner pointed out above. Thus the reading device including the relays 39 and vacuum tubes 34 are adapted to read the characters being transmitted over either an A or B multiplex channel and to switch the "X" tape transmitter into the circuit when an end-of-message signal is detected in either of such types of circuits. In all other respects, the "X" cord circuit operates in substantially the same manner when connected to a B channel as when connected to an A channel.

Figure 5:
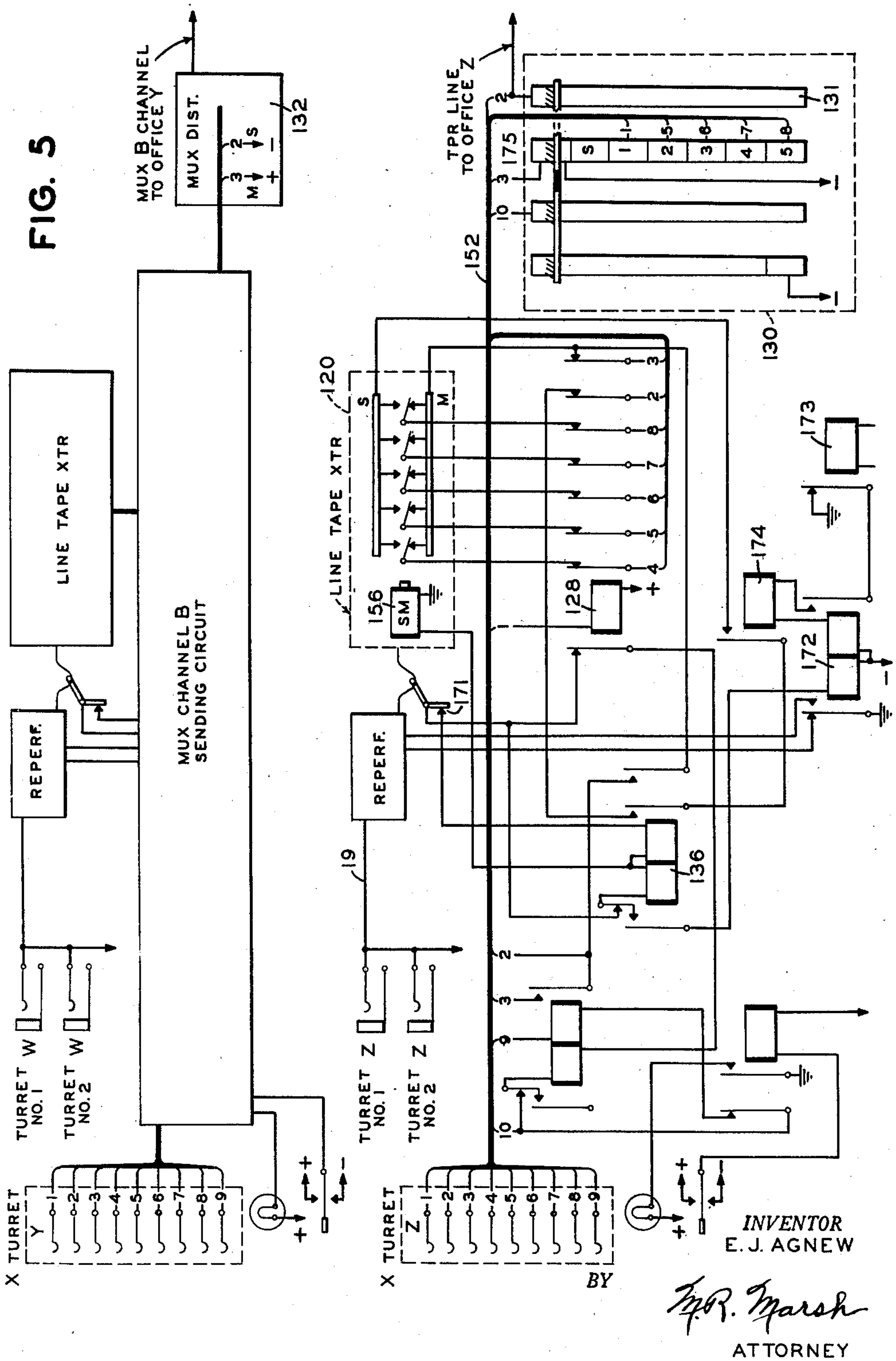

Fig. 5 shows the essential circuits of a jack circuit connection that may be assigned to a teleprinter line such as that represented as leading to office Z. Here the tongues of line transmitter 120 are normally associated with the teleprinter sending line through back contacts and tongues of a relay 128. The code combinations transmitted from the line transmitter 120 are distributed to the sending circuit through the operation of a constantly rotating distributor 130.

When the plug 26 of the "X" cord circuit is inserted in the jack such as the Z, Fig. 5, associated with the teleprinter line extending to remote office Z, relay 29 of the cord circuit operates by a circuit extending through the No. 1 contacts of the plug and jack and the coil of relay 128 to positive potential. Relay 128, however, does not operate at this time since resistance 31 limits the current to some value below that necessary to operate relay 128. A leak circuit from the No. 1 contact of plug 26 extends through a resistance 86 to the control grid of a vacuum tube 87. When plugged up to a teleprinter jack, the No. 1 contact of plug 26 is connected to positive potential and the positive potential applied to the grid of vacuum tube 87 permits the same to pass current. The coil of relay 62 is in the plate circuit of vacuum tube 87 and, therefore, relay 62 becomes operated at this time. Relay 62 locks up through its first tongue and the front contact and second tongue of relay 29 to ground.

The spacing impulses transmitted over a teleprinter line are normally intervals of no current whereas the marking impulses are normally intervals of either positive or negative potentials. In the jack circuit shown in Fig. 5 for the teleprinter line to office Z the marking impulses are intervals of negative potential. On the plugging operation, the reading device of the "X" cord circuit begins to read the characters transmitted from the line transmitter 120 if the same is active and the grids of vacuum tubes 34 will have substantially zero potential or negative potential applied thereto in accordance with the spacing and marking impulses transmitted from the transmitter 120. Vacuum tubes 34 pass current when the grids are positive or have substantially zero potential thereon and, accordingly, when a period from a teleprinter line transmitter such as 120 is read, only the fourth tube 34 will not pass current and all relays 39 except 39d will be operated. This condition as described effects operation of relay 37 which is followed by operation of relay 41 and if a second period follows immediately, or without other characters being interposed between the two periods, relay 44 is operated to initiate the sequence of operation whereby relays 128 and 61 are operated to connect the "X" transmitter to the sending circuit and disconnect the line transmitter 120 therefrom.

During an idle condition of a teleprinter line such as that extending to office Z, Fig. 5, marking potential is applied thereto. If this condition is caused by taut tape opening the tape lever contacts 171 associated with the teleprinter line transmitter 120, the auto-control relay 136 will be in an energized condition and if the taut tape is due to the associated intra-office circuit 19 being idle, the relay 173 will be unoperated. Accordingly, when relay 136 operates, relay 172 will for such a condition also operate and be locked up by a circuit through the right hand winding thereof and the coil of relay 174. Thus relay 174 will also be operated and remain locked up during such an idle condition of the teleprinter transmitter 120. Operation of relay 136 effects energization of the teleprinter transmitter stepping magnet 156 and the locking of the tongues thereof against the spacing bus bar. With the relays 136 and 174 operated, steady negative marking potential from the rest segment 175 of the distributor 130 is applied through the seventh tongue and back contact of relay 128, the second right hand tongue and front contact of relay 136, the No. 2 conductor of cable 152, to the solid ring 131 of the distributor 130 and to the outgoing teleprinter line to office Z. This marking potential is also applied through the sixth tongue and back contact of relay 128, the first right hand tongue and front contact of relay 136, the tongue and front contact of relay 174, to the spacing bus bar of transmitter 120. Thus as the right hand brush of distributor 130 wipes over the transmitting segments 1 to 5, marking potential is applied through contacts Nos. 4 to 8 of the plug and jack to the grids of vacuum tubes 34. This negative potential maintains the tubes 34 non-conducting and their associated relays 39 in a deenergized condition.

The operation of relay 62 incident to the plugging operation, by means of its second right hand tongue connects the grid of tube 76 to the front contacts of the inner tongues of relays 39. These tongues of relays 39 are connected through the back contact and right hand tongue of relay 37 to negative potential so that the operation of any one of these relays maintains the control grid of vacuum tube 76 in a negative condition. However, as set forth, relays 39 are all deenergized during an idle condition of the teleprinter line transmitter 120 and therefore the operation of relay 62 permits vacuum tube 76 to become conducting for such a condition after the operation of relay 62 and the dissipation of the negative charge on the grid through the grid leak 117. When tube 76 passes current, it causes operation of relay 44 to initiate the sequence of operation whereby the "X" transmitter 29 is connected to the sending circuit and the teleprinter transmitter 120 disconnected therefrom. This operation consists primarily of energization of relays 61 and 128.

Operation of relay 62 by its left hand tongue applies negative potential to the first left hand tongue of relay 79 so that should relay 79 operate, as a result of taut tape between the printer-perforator 23 and the "X" transmitter 27 causing the opening of tape lever contacts 78, negative potential is applied through the step magnet 81 to ground. Operation of relay 79 establishes a circuit for the negative marking potential brought into the "X" cord circuit through contact No. 3 of plug 26 and the sixth tongue and front contact of relay 61 which will be operated at this time, through the front contact and right hand tongue of relay 79, the front contact and outer right hand tongue of relay 62, the back contact and first tongue of relay 43, the front contact and seventh tongue of relay 61, through the No. 2 contact of plug 26 and teleprinter jack to the solid ring 131 of distributor 130 therein. In this manner taut tape in the "X" transmitter 127 when connected to and transmitting over a teleprinter line causes marking potential to be applied to the line.

If the "X" transmitter 27 is plugged up to a teleprinter line that is idle because the tape lever contacts 171 associated with the line transmitter are open while the associated intra-office 19 is busy, the "X" transmitter will not at this time, without operation of the pre-empt key 83, be operatively connected to the teleprinter line. As pointed out, steady marking potential is applied to the teleprinter line through the outer tongue and front contact of relay 136 when the tape lever contacts 171 are open, and if at this time the intra-office circuit 19 is busy, as indicated by the energized condition of relay 173, relay 174 will not be operated. Accordingly, steady negative potential will not be applied to the spacing bus bar S against which the tongues of the line transmitter 120 are locked as is the case if the tape lever contacts 171 are open during the time the intra-office circuit 19 is idle.

With the spacing bus bar S open, no potential will be applied to the grids of tubes 34 and they will pass current to operate all the associated relays 39 only while the teleprinter distributor brush is passing over segments 175 and S of the transmitting ring. While the brush is passing over transmitting segments 1 to 5, negative potential from the segment 175 will be applied through the tongues of transmitter 120 and the spacing bus bar S to the grids of tubes 34 and cause deenergization of the relays 39. This sequence will be repeated for every revolution of the distributor brushes and the periodic application of negative potential to the grid of tube 76 through the inner tongues and back contacts of relays 39 will for these conditions prevent the same from passing current to operate relay 44 and initiate the sequence of operation that would transfer the control of the distributor 120 to the "X" transmitter from the regular line transmitter 120.

In substantially all other respects the "X" cord circuit and teleprinter jack circuit operate in much the same manner as that described above in connection with the transmission to multiplex circuits. The operation of the pre-empt key 83 of the "X" cord circuit immediately connects the "X" transmitter to a teleprinter line regardless of the busy or idle condition thereof.

While the foregoing is a detailed description of one form of the invention, it is obvious that various modifications thereof may be made if desired without departing from the scope of the invention as defined in the appended claims.

What is claimed is:

1. In a telegraph switching system, a plurality of sending circuits first transmitters normally operatively associated with said circuits for transmission thereover, a second transmitter, a reading device associated with said second transmitter, manually operable means for unoperatively associating said second transmitter with any one of said sending circuits at a time and incident thereto render said reading device operative to read signals transmitted from a first transmitter and means controlled by said reading device on the detection of certain signals transmitted from said first transmitter to said sending circuit or the absence of signals from said first transmitter to operatively disassociate said first transmitter from said sending circuit and operatively associate said second transmitter therewith.

2. In a telegraph switching system, a plurality of transmitting circuits, a plurality of first and a single second storage controlled transmitting means, said first transmitting means being normally conditioned to transmit to said transmitting circuits signals stored in associated storage medium, a signal reading means, manually operable means to associate said reading means with any one of said transmitting circuits to read the signals transmitted thereover and to condition said second transmitting means for connection to said transmitting circuit for transmission thereover of signals stored in its associated storage medium, means controlled by said signal reading means in response to an end-of-message signal transmitted from said first transmitting means to stop further transmission from said first transmitting means and initiate transmission from said second transmitting means to said transmitting circuit.

3. In a telegraph switching system, a plurality of transmitting circuits, a plurality of first storage controlled transmitting means normally conditioned to transmit to associated transmitting circuits signals stored in their associated storage medium, a second storage controlled transmitting means, a signal reading means, manually operable means to associate said reading means with said transmitting circuits to read the signals transmitted thereover and to condition said second transmitting means for connection to a transmitting circuit for transmission thereover of signals stored in its associated storage medium, means controlled by said signal reading means in response to an end-of-message signal transmitted from said first transmitting means to stop further transmission from said first transmitting means and initiate transmission from said second transmitting means to said transmitting circuit, and means controlled by said signal reading means in response to an end-of-message signal transmitted from said second transmitting means to stop further transmission therefrom and reconnect said first transmitting means to said transmitting circuit.

4. In a telegraph switching system, a plurality of sending circuits, a transmitter individual to and adapted to transmit signal code groups of marking and spacing line conditions over associated sending circuits with the marking and spacing line conditions on one sending circuit corresponding to the spacing and marking line conditions on another sending circuit, an auxiliary transmitter normally disassociated from all of said sending circuits, signal reading means associated with said auxiliary transmitter, means for connecting said reading means to any of said sending circuits to read signal code groups, if any, transmitted from associated transmitters, means for automatically connecting said auxiliary transmitter to such a sending circuit in response to an end-of-message signal from its normally connected transmitter and means for automatically adapting said auxiliary transmitter to transmit the proper line conditions to its connected circuit representative of the signals stored in its control medium.

5. In a telegraph switching system, a plurality of different types of sending circuits wherein marking and spacing code group signal impulses are represented by different line conditions on different types of said circuits, individual line transmitters normally associated with said circuits for the transmission thereover of signals stored in associated storage means, an auxiliary transmitter, a signal reading device associated therewith, means for associating said reading device with said sending circuit one circuit at a time, means for conditioning said reading device in accordance with the circuit to which it is associated to properly read marking and spacing impulses transmitted thereover and means controlled by said reading device on the reading of predetermined code groups to disconnect the line transmitter from the sending circuit, connect said auxiliary transmitter thereto and adapt said auxiliary transmitter to transmit marking and spacing impulses to the circuit representative of its storage means in accordance with the type of circuit.

6. In a telegraph exchange system, a plurality of different types of sending circuits, a sending signal distributor means individual to each of said circuits, a transmitter and associated signal storage medium individual to each of said distributors and normally arranged to control the same to transmit code groups of line conditions characteristic of its line in accordance with the signals stored in its storage medium, an auxiliary transmitter, a signal reading device, means for associating said reading device with said sending circuits, one at a time, means for adapting said reading device to determine the type of circuit with which it is associated and control said device in accordance therewith, means controlled by said reading device to associate said auxiliary transmitter with the circuit it is reading on the detection of predetermined code groups and adapt said auxiliary transmitter to control the associated distributor to transmit to said circuit code groups of line conditions characteristic thereof in accordance with the signals stored in the storage medium of said auxiliary transmitter.

7. In a telegraph switching system, a plurality of different types of sending circuits wherein marking and spacing code group signal impulses are represented by different line conditions on different types of said circuits, individual primary transmitting means normally operative to effect transmission of signal code groups over associated sending circuits, a secondary transmitting means, means for associating said secondary transmitting means with any one of said sending circuits at a time and means associated with said secondary transmitting means to determine the type of sending circuit to which it is associated and adapt the same to transmit code groups of impulses thereover in accordance with its associated storage medium whereby character representing signal impulses transmitted from said secondary transmitting means are the same as signal impulses representing similar characters transmitted from the primary transmitting means of the circuit to which said secondary transmitting means is associated.

8. In a telegraph system, a plurality of local transmission circuits, storage medium preparing devices controlled by signals received over said circuits to store the received signals in associated mediums, signal sending circuits, first transmitters controlled by associated mediums to transmit stored signals to said sending circuits, a second transmitter, means for establishing a partial connection between said second transmitter and any one of said sending circuits and if its first transmitter is busy to read the signal being transmitted, means to complete the connection of said second transmitter to said circuit on the transmission of an end-of-message signal from its first transmitter, and means operative on the establishment of a partial connection and the detection of an idle condition of an associated first transmitter to determine the condition of said local circuit and to complete said connection on the detection of an idle first transmitter and an idle local circuit.

9. In a telegraph system, a local transmission circuit, a storage medium preparing device controlled by signals received over said circuit to store the received signals in a medium, a signal sending circuit, a first transmitter controlled by said medium to transmit stored signals to said sending circuit, a second transmitter, means for establishing a partial connection between said second transmitter and said sending circuit and if said first transmitter is busy to read the signal being transmitted, means to complete the connection of said second transmitter to said circuit on the transmission of an end-of-message signal from said first transmitter, a timing means, and means controlled by said timing means and operative on the establishment of said partial connection and the detection of an idle condition of said local circuit to complete said connection after a predetermined length of time after the detection of an idle first transmitter and an idle local circuit.

10. In a telegraph system, a sending circuit, a first transmitter normally operatively associated with said circuit, a second transmitter, a first manually operable means for initiating the disassociation of said first transmitter from said circuit and the assication of said second transmitteer therewith, means to normally delay full operation of said means when said first transmitter is busy until the transmission of an end-of-message thereby and a second manually operable means for effecting full operation of said means substantially immediately after operation of said first manual means.

11. In a telegraph system, a sending circuit, a first transmitter normally operatively associated with said circuit, a second transmitter, switching means including a plug and jack for associating a second transmitter with said circuit, means normally operative on the insertion of said plug in said jack to switch control of said circuit from said first transmitter to said second transmitter following the transmission of predetermined signals from said first transmitter and means to effect said switching operation substantially immediately on said plugging operation.

12. In a telegraph system, a sending circuit, a first transmitter normally operatively associated with said circuit, a second transmitter, switching means including a plug and jack for associating said second transmitter with said circuit, means normally operative on the insertion of said plug in said jack to switch control of said circuit from said first transmitter to said second transmitter following the transmission of predetermined signals from said first transmitter, means to effect said switching operation substantially immediately on said plugging operation, and means operative with said second transmitter in control of said circuit to switch control thereof back to said first transmitter on the transmission of predetermined signals from said second transmitter.

13. In a telegraph system, a plurality of telegraph channels of communication adapted to have character code groups of impulses of different line conditions transmitted thereover with the same characters represented by different line conditions on different channels, a character reading device and a storage controlled transmitter associatable with said different channels one at a time, a control circuit operated by said reading device and means controlled by said reading device to operate said control circuit to condition said transmitter to transmit to the associated channel code groups representative of stored characters on the reading of a predetermined character transmitted over any one of said circuits with which it is associated.

EDWARD J. AGNEW.

REFERENCES CITED

The following references are of record in the file of this patent:

UNITED STATES PATENTS

| Number | Name | Date |
|---|---|---|
| 1,943,475 | Gurley | Jan. 16, 1934 |
| 2,193,809 | Dirkes | Mar. 19, 1940 |
| 2,340,576 | Bacon | Feb. 1, 1944 |
| 2,379,865 | Connery | July 10, 1945 |
| 2,406,787 | Bacon | Sept. 3, 1946 |